(12) United States Patent
Loebl et al.

(10) Patent No.: US 8,061,080 B2
(45) Date of Patent: Nov. 22, 2011

(54) CONTROLLING DEVICE FOR A GREENHOUSE

(75) Inventors: Hans-Peter Loebl, Monschau-Imgenbroich (DE); Wolfgang O. Budde, Aachen (DE); Joseph Hendrik Anna Maria Jacobs, Eygelshoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 209 days.

(21) Appl. No.: 12/517,296

(22) PCT Filed: Dec. 3, 2007

(86) PCT No.: PCT/IB2007/054885
§ 371 (c)(1), (2), (4) Date: Jun. 2, 2009

(87) PCT Pub. No.: WO2008/068699
PCT Pub. Date: Jun. 12, 2008

(65) Prior Publication Data
US 2010/0076620 A1   Mar. 25, 2010

(30) Foreign Application Priority Data
Dec. 7, 2006   (EP) .................................... 06125594

(51) Int. Cl.
*A01G 9/20*   (2006.01)

(52) U.S. Cl. ................................................. 47/58.1 LS
(58) Field of Classification Search ........ 47/17, 58.1 LS
See application file for complete search history.

(56) References Cited

U.S. PATENT DOCUMENTS

| 4,255,897 | A | 3/1981 | Ruthner |
| 4,569,150 | A * | 2/1986 | Carlson et al. ................. 47/17 |
| 5,818,734 | A | 10/1998 | Albright |
| 7,502,655 | B2 * | 3/2009 | Albright et al. ............... 700/36 |
| 7,617,057 | B2 * | 11/2009 | May et al. ..................... 702/62 |
| 2003/0005626 | A1 | 1/2003 | Yoneda et al. |
| 2003/0150394 | A1 | 8/2003 | Wolfe |
| 2005/0252078 | A1 | 11/2005 | Albright et al. |
| 2009/0126268 | A1 * | 5/2009 | Van Duijn et al. ........... 47/62 R |
| 2010/0076620 | A1 * | 3/2010 | Loebl et al. ................. 700/306 |

FOREIGN PATENT DOCUMENTS

| GB | 2402037 A | 12/2004 |
| SU | 1405729 A | 6/1988 |
| SU | 1508999 A | 9/1989 |

* cited by examiner

Primary Examiner — Frank T Palo

(57) ABSTRACT

The invention relates to a controlling device (10) for a greenhouse (15), with a computerized control element (20), a lighting element (30) and at least one detector element (40), wherein the lighting element (30) and the detector element (40) are connected with the computerized control element (20), wherein the lighting element (30) comprises at least one light emitting mean (31), emitting a light (32), wherein the light (32) illuminates a plant (70) growing in the greenhouse (15).

20 Claims, 2 Drawing Sheets

CONTROLLING DEVICE FOR A GREENHOUSE

This invention relates to a controlling device for a greenhouse with a computerized control element, a lighting element and at least one detector element, wherein the lighting element and the detector element are connected with the computerized control element, wherein the lighting element comprises at least one light emitting mean, emitting a light, wherein the light illuminates a plant growing in the greenhouse.

In the US 2005/0252078 A1 a system for optimizing a plant production in a cost effective manner is described. The system includes a processor, which communicates with a number of resource controllers, measuring different resources within the greenhouse, like for example the lighting or the carbon dioxide concentration. The processor implements an algorithm that receives a desired plant production rate and other input, such as operating conditions of the system and environment, and determines an amount of each resource to expend consistent with plant production goals and resource costs. Unfortunately, the system described in the said patent application is only optimized concerning the costs of the plant production.

Thus, the invention has for its object to eliminate the above mentioned disadvantage. In particular, it is an object to the invention to provide an efficient controlling device for a greenhouse, which leads to an optimal growth of a plant.

This object is achieved by a controlling device for a greenhouse as taught by the present disclosure. Also the object is achieved by a method for controlling a growth of a plant in a greenhouse as taught by the present disclosure.

The object of the invention is achieved by a controlling device for a greenhouse, with a computerized control element, a lighting element and at least one detector element, wherein the lighting element and the detector element are connected with the computerized control element, wherein the lighting element comprises at least one light emitting mean, emitting a light, wherein the light illuminates a plant growing in the greenhouse, the detector element measures an oxygen partial pressure in the greenhouse and an amount of the light emitted by the light emitting mean is controllable by the computerized control element, depending on the measured oxygen partial pressure.

The term computerized control element in the context of the described invention comprehends all kinds of computer controlled machines like for example laptop, workstation, microcontroller, digital signal processor (DSP) or field programmable gate array (FPGA). Such computerized control elements are known to receive process and store data, which are measured by all kinds of detector elements. The computerized control element may also be a PDA (Personal Digital Assistant), a handheld device that was original designed as a personal organizer, but nowadays is much more versatile. The use of a PDA as the computerized control element would enable a gardener to own a mobile system which allows him to control the greenhouse. Any changes in the environmental settings could be done during the inspections of the greenhouse.

In the context of the present invention, the term detector element comprises a sensor which is electrically or electronically driven. Such kind of detector elements may either be directly indicating or are paired with an indicator so that the value sensed becomes human readable. The detector element may be arranged central within the greenhouse. It is also possible, that a plurality of the detector elements is spatially distributed in the greenhouse. Furthermore, the detector elements may be arranged in groups to measure a microclimate within the greenhouse, so that the environmental parameters are measured and steered according to the described method.

According to a preferred embodiment of the present invention, the controlling device comprises at least one second detector element, measuring a photosynthesis activity of the plant. The second detector element may for example measure the glucose or the starch level of the plant, because they are a direct indication of the photosynthesis activity of the plant. Furthermore, the second detector element may measure the amount of light, being absorbed by the leaf of the plant.

According to another embodiment the controlling device comprises at least one third detector element, measuring a third resource. This additional measurement enables the controlling device of nothing less than the total control of all resources, influencing the growth of the plant or a seed. The choice of the measured third resource is depending on the type of grown plant or seed. It may be a temperature of the substrate or the soil, a temperature of the air, a humidity of the substrate or the soil, a concentration of the fertilizer in the substrate or the soil, a humidity of the air, a carbon dioxide partial pressure or a flux of external sunlight. Furthermore, the third detector may be a spectrometer to measure the spectrum of the external sunlight or the light, emitted by the light emitting mean. It is known, that chlorophyll, being a green photosynthetic pigment found in most plants, helps the plant to get energy from light. It has been measured that Chlorophyll A and B absorb light in the blue and red optical spectrum. Therefore it is beneficial to enlighten the plants with light having a wavelength within the blue or the red wavelength band. To check the wavelength distribution of the light being emitted by the light emitting mean the spectrometer can be used. For example the spectrometer may comprise a dispersing optical element, which may be a prism, a diffraction grating, a holographic optical element or any other suitable element. The light entering the spectrometer and being dispersed by the dispersing optical element is made incident on a linear detector array, which may be a CCD array. The spectrum can also be measured without optical elements and/or filters, using complementary metal-oxide-semiconductor (CMOS) technology.

As the greenhouse is interacting with the outer world, the third detector element may for example also measure an amount of air, coming in or out of the greenhouse. In this embodiment the third detector element may not only measure the humidity of the in- or out coming air, but in particular also the speed, temperature and oxygen partial pressure. The so measured information is fed into the computer controlled element, enabling it to optimize the amount of light, being emitted by the light emitting mean.

According to another embodiment the controlling device comprises at least one supply element, wherein the supply element supplies a second resource to the plant, wherein an amount of the second resource, being donated to the plant, is controllable by the computerized control element. The second resource may for example be water, a fertilizer or other nutrients needed by the plant. According to the invention, the third detector element measures all necessary resources, needed by the plant to grow properly. All the information detected by the third detector element are collected and analyzed in the computerized control element. If a shortage of any kind is measured, the computerized control element tries to compensate this shortage. Therefore the supply element is able to deliver all kind of substrates, needed by the plant to grow properly, and which are named in the context of the invention second resource. Therefore the supply element may comprise a water supply mean or a nutrition supply mean, each of those being connected with the computerized control element. The computerized control element is able to control the amount of the second resource, being delivered to the plant as a result of the measured shortage. Furthermore, the amount of the second resource and the amount of light delivered to the plant are optimized by the computerized control element. So the computerized control element measures, delivers and optimizes all necessary resources, which are needed to ensure a high quality growth of the plant.

According to a preferred embodiment the lighting mean is a LED, an OLED, a gas discharge lamp, a high intensity discharge lamp, an incandescent lamp, a fluorescent lamp or a high pressure sodium lamp. The lighting element may comprise a number of light emitting means, which are spatially distributed in the greenhouse to achieve a homogeneous illumination. According to a preferred embodiment the lighting element comprises a combination of at least two different types of the named lighting means. For example, the lighting element may comprise a combination of a high pressure sodium lamp and a LED, a combination of a LED and an OLED or a combination of a high pressure sodium lamp and an OLED.

LEDs (Light Emitting Diode) have the advantage that their spectrum can be designed such that it exactly meets the requirements of plants. The said advantage also apply to an OLED (Organic Light Emitting Diode) which is a special type of a light emitting diode in which the emissive layer may comprise a thin film of certain organic components. The advantage of the OLED is that it is a homogeneous large area light source with potentially low cost and high efficiency and hence, OLEDs are better suited for horticulture applications where the total cost of ownership is important. These OLEDs utilize current flowing through a thin-film of organic material to generate light. The color of light being emitted and the efficiency of the energy conversion from current to light are determined by the composition of the organic thin-film material. However, the OLEDs comprise a substrate material as a carrier layer, which may be made of glass or an organic material or from non transmittive materials such as metal foils. Furthermore, organic light emitting diodes consist of at least one very thin layer with a layer thickness of approx. 5-500 nm of organic substances on a glass substrate covered with an electrically conducting and optically transparent oxide. This conducting layer usually is performed as Indium-Tin-Oxide (ITO).

Usually the ITO-layer forms the anode and a layer of Aluminum forms the cathode, whereas the Aluminum layer features a thickness of approx. 100 nm and thus a thickness like the ITO-layer. Aluminum of such a thickness works as a mirror, such that the emission is through the transparent ITO anode and the transparent substrate only. If the cathode metal is thin enough to be partially transparent, part of the light can also be emitted through the cathode. By using other appropriate materials as cathode, the OLED can be made optical transparent. In this case the OLED may work as a kind of window, which at daytime is letting the sunlight falling into the greenhouse. But at nighttime the OLED may work as a lighting mean, illuminating the greenhouse.

According to another embodiment of the invention the lighting element can consist of an array of OLEDs, comprising at least two different groups of OLEDs, wherein the first group of OLEDs deliver a grow light and the second group of the OLEDs deliver a control light for the plant. It is known, that the sheer growth of the plant is mainly depending on the amount of light, possessing the wavelength absorbed by Chlorophyll A or B. To achieve a generous growth of the plant the first group of OLEDs of the light emitting element should consists of at least two types of OLEDs, emitting at different wavelength. It is preferred that the first type of OLED emits in the region of blue light with a wavelength between 400 nm to 500 nm. Furthermore, the second type of OLED should emit in the region of red light between 600 to 700 nm. In another preferred embodiment the grow light emitted by the first group of OLEDs can consists of approximately 80% to 90% red light and 10% to 20% blue light.

In addition to the described grow light, a control light should be used to steer the growth of the plant. The growths of a plant whether it is huge or small and compact can be controlled by illuminating the plant with light of different colors. It is known, that the use of a large amount of blue light (400 nm to 500 nm) results in a tall plant whereas the use of a small amount of blue light results in a small and compact plant. Furthermore, the light in the green spectrum increases the tendency of the plant to propagate. In addition, by using light with the appropriate wavelength the blooming of the plants can be controlled. So by controlling the type of wavelength being emitted onto the plants, the way and the manner of the growing of the plant can be controlled.

In a preferred embodiment the controlling device comprises at least one shading mean, wherein by moving the shading mean the level of sunlight shining into the greenhouse is controllable. The shading mean may be used to cover a roof window of the greenhouse to protect the damageable seed and plant from getting burned in the sunlight. Therefore a motor positioned and computer control shading mean can be installed and connected with the controlling device described in the invention.

In an advantageous embodiment of the present invention the controlling device comprises a wired or a wireless network, connecting the computerized control element, the detector element, the second and third detector element as well as the said means. By the use of a network all information from the detector element can easily be broad to the computerized control element, calculating the optimal amount of light to be emitted by the light emitting mean. A wired network is preferable in those conditions where a reliable connection between the control element and the detector element is needed. However, additional hardware, like wires, has to be distributed in the greenhouse to operate a network of such type. The disadvantage is avoided by the use of a wireless network. Especially in already existing greenhouses an ad hoc network is preferable, because it does not require any mounting of spatial distributed hardware. Different connectivity technologies can be used for implementing the wireless network, but it is preferred to use Bluetooth, ZigBee or WiFi connection technologies. Especially the last two named have the advantage that they do not interfere with electromagnetic waves emitted by the light emitting mean.

Furthermore, it is preferable that the computerized control element comprises a database to store the measured values of the detector elements. By analyzing the values, measured over a longer period of time, the efficiency of the greenhouse can be enhanced. By comparing the measured values of successive growing cycles of the plant, its quality can be preserved or improved.

The object of the invention is also achieved by a method for controlling a growth of plant in a greenhouse, the method comprising:
    measuring an oxygen partial pressure within the greenhouse, said oxygen partial pressure related to a photosynthetic activity of a plant in the greenhouse,
    transferring the value of the oxygen partial pressure to a computerized control element, determining an optimal amount of light needed for a best possible growth of the plant in dependence on the measured oxygen partial pressure, and adjusting an actual amount of light emitted by a lighting element to the optimal amount.

In another preferred embodiment the method comprises measuring the value of a resource of the greenhouse, like the oxygen partial pressure, on different spatial positions and calculating a spatial averaged value. By using this method spatial variations of the resource are averaged out. In another preferred embodiment, the method comprises repeating the measuring of the value of a resource, like the oxygen partial pressure, within a limited spatial area and calculating a timewise averaged value. A timewise averaged value has the advantage that fluctuations at a certain detector element are averaged out, so that only long term variations of the measured values are detected. The said spatial or timewise averaged values can be stored in the database mentioned above. This would enable the user of the controlling device to monitor a drift of the important resources on a daily, weekly or monthly base. Furthermore, a feedback loop may be integrated in the controlling device. The feedback loop is a system where outputs are fed back into the system as inputs, resulting in a self correcting and self limiting calculation of new output values.

The combination of the feedback loop with the database, storing past values, leads to an optimal determination of the needed amount of light for the best possible growth of the plant. It is preferred, that the calculated amount of light is influenced by the Chlorophyll absorption curves and depending on a plurality of measurements. So not only the amount of light but also its wavelength distribution can be calculated and controlled by the described controlling device.

The object of the invention is also achieved by a controlling device according to the described claims, being operated according to one of the described methods.

The aforementioned usage of a controlling device for a greenhouse, the method, as well as claimed components and the components to be used in accordance with the invention in the described embodiments, are not subject to any special exceptions with respect to size, shape, material selection as technical concept such that the selection criteria are known in the pertinent field can be applied without limitations. Additional details, characteristics and advantages of the object of the present invention are disclosed in the subclaims and the following description of the respective figures. The figures are an exemplary fashion only and show a preferred embodiment of the illumination device according to the present invention.

These figures are:

Figure 1:
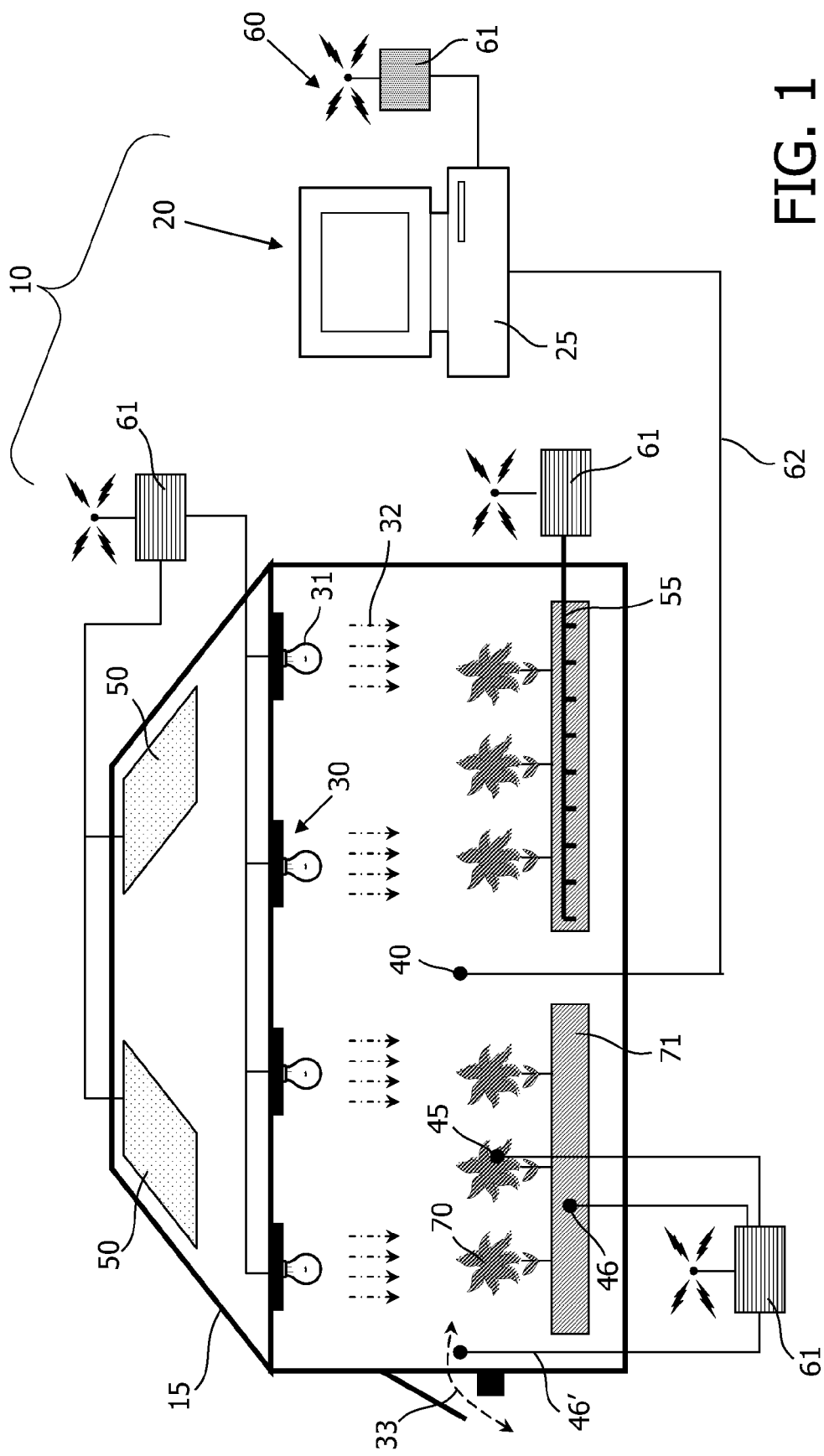
FIG. 1 shows a schematic view of a greenhouse with a controlling device.

FIG. 1 shows a schematic view of a greenhouse 15 with a controlling device 10 according to the present invention. In the greenhouse, two rows of bed 71 are shown. The bed 71 contains a soil or substrate in which a plant 70 is grown. As research has demonstrated, the optimal growth of the plant 70 is depending on the availability of a number of resources. The growth of the plant 70 is directly correlated with its photosynthesis, being the synthesis of sugar from light, carbon dioxide and water, with oxygen as a waste product. So the main responsible resource for the growth of the plant 70 is the available amount of light, absorbed by Chlorophyll A and B. By measuring the oxygen partial pressures an extremely precise indicator of the efficiency of the running photosynthesis and therefore of the status of the plant 70 is obtained. To create an optimal environment for the growing of the plant 70, the greenhouse 15 comprises a computer controlled element 20, a lighting element 30 and at least one detector element 40. The lighting element 30 is arranged above the bed 71 of the plant 70. Each lighting element 30 may comprise a number of light emitting means 31, emitting a light 32. Depending on the season and on the plant 70, the lighting element 30 may either be the only source of light or a supplement to the natural sunlight. The last named has the advantage that it is free of charge whereas the artificial light can easily be tuned to match exactly the absorption band of the Chlorophyll A and B. Furthermore, the light emitting element 30 can comprise a number of light emitting means 31 arranged in an array to illuminate greater parts of the greenhouse 15. In the shown FIG. 1, the detector element 40 is positioned in the middle of the greenhouse 15, measuring the oxygen partial pressure. To reach this aim, the detector element 40 can use a plurality of technologies such as zirconia, mass spectrometry, electrochemical, infrared, ultrasonic and laser.

To complete the surveillance of the photosynthesis and the health of the plant 70 the controlling device 10 comprises a second detector element 45 and a third detector element 46. In the shown embodiment the second detector element 45 senses the glucose or starch level of the plant 70. The third detector element 46 measures a third resource, which may vary depending on the grown plant 70. The measured third resource can therefore be for example a temperature of the substrate or soil, a temperature of the air, the humidity of the substrate or the soil, a concentration of the fertilizer and the substrate or the soil, the humidity of the air, a carbon dioxide partial pressure or a flux of external sunlight. The amount of the last said resource can also be controlled by shading means 50, arranged on the roof of the greenhouse 15. The shading mean 50 covers a not shown window, through which the sunlight is shining into the greenhouse 15. By moving the shading means 50 the level of sunlight can be controlled. As the greenhouse may comprise windows, the third detector element 46' may measures an amount of air 33, coming in or out of the greenhouse. The measured values may also include the speed, temperature and oxygen partial pressure of the in- or out coming air 33. The so measured information is fed into the computer controlled element 20, enabling it to optimize the amount of light, being emitted by the light emitting mean 31.

Furthermore, the controlling device 10 may comprise a supply element, wherein the supply element supplies a second resource to the plant, wherein an amount of the second resource, being donated to the plant 70, is controllable by the computerized control element 20. In the shown embodiment, the supply element is a water supply mean 55, wherein the water supply mean 55 irrigates the plant 70. According to the invention, the third detector element 46 may measure the humidity of the soil in the bed 71. If a shortage of any kind is measured, the computerized control element 20 tries to compensate this shortage, by irrigating the plant 71 with the help of the water supply mean 55.

The shown detector elements 40, 45, 46, 46' are all connected with the computerized control element 20. The detector element 40, measuring the partial oxygen pressure, is connected by a wired network 62 with the computerized control element 20. The other named detector elements 45, 46, 46' as well as the lighting element 30, the water supply mean 55 and the shading means 50 are connected through a wireless network 60 with the computerized control element 20. The wireless network 60 comprises a plurality of communication means 61. A first communication mean 61 is attached to the computerized control element 20. Other communication means 61 are connected with the second and third detector element 45, 46, 46' or the lighting elements 30. Wireless networks 60 can especially be used in already existing greenhouses 15 for implementing the described controlling device 10. Especially ad hoc networks are useful, because they do not require a base station. Instead the participants discover others within the range to form a network for the computerized control element 20. These self generating networks are easy to use, reliable and cheap and therefore, an ideal solution for the communication with the computerized control element 20. In the shown embodiment the computerized control element 20 is a workstation. As it has been said before it may also be a PDA to achieve a mobile controlling system. The computerized control element 20 may comprise a user interface 25, being a keyboard. The computer interface 25 enables a user to feed information concerning the plant 70 into the computerized control element 20. In combination the measured and stored information the computerized control element 20 can control the amount of light 32 emitted by the light emitting mean 31, depending on the measured oxygen partial pressure.

Figure 2:
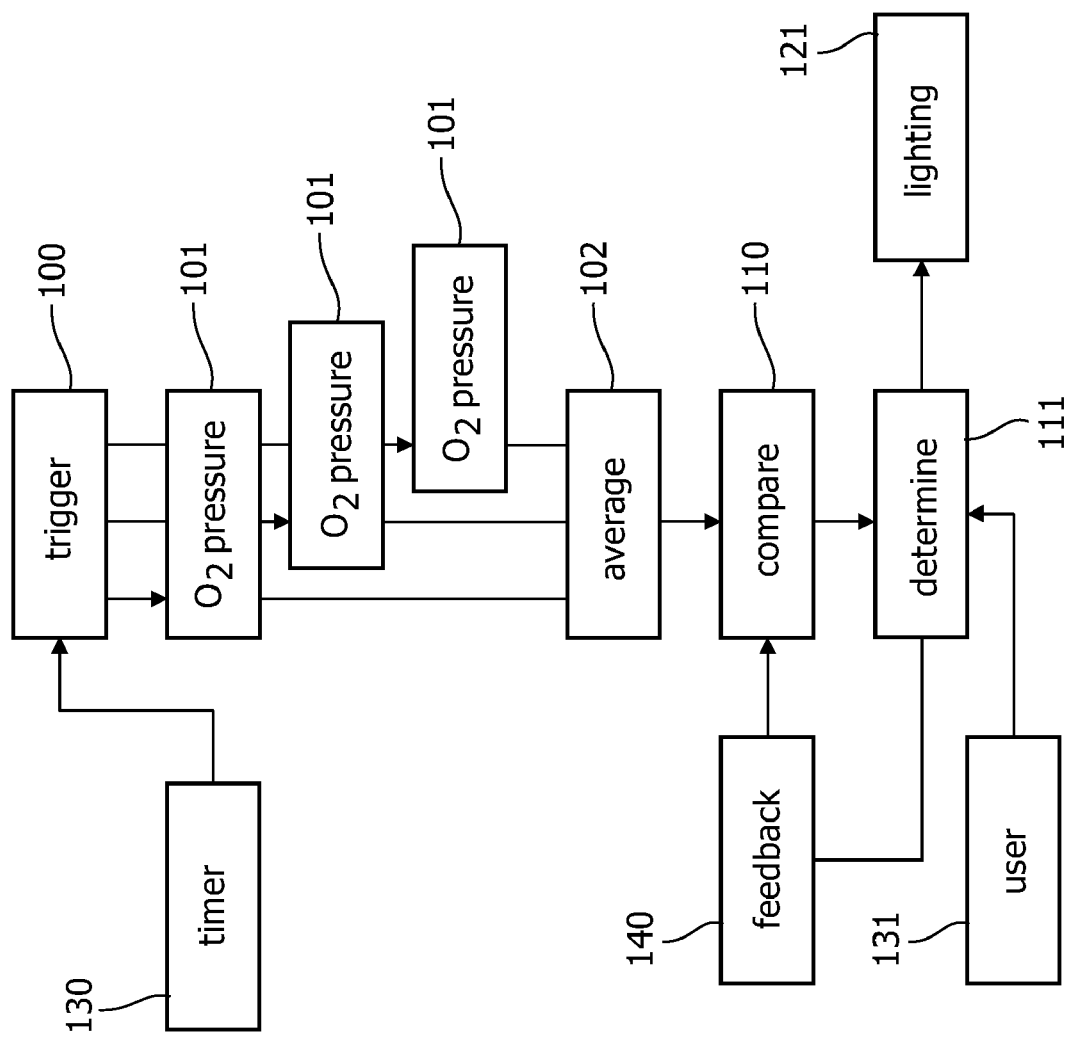
FIG. 2 shows a flowchart for illustrating the method of the present invention.

To illustrate the method used for controlling the growth of the plant 70 in the greenhouse 15, FIG. 2 shows a flowchart. In a first step 101 the oxygen partial pressure is measured a multiple time. In the subsequent the measured oxygen values are averaged 102. If a plurality of detector element 40 is equally distributed in the greenhouse 15, by averaging a mean value for the whole greenhouse 15 is calculated. On the other hand a plural number of measurements, done by a single detector element 40 can be averaged to calculate a timewise averaged value. Furthermore, the values measured by a single detector element 40 can be analyzed to calculate the effects of limited microclimates within the greenhouse 15. In the next step 110, the measured values for the oxygen partial pressure are compared with the known optimal values. With the help of the calculated deviation an optimal amount of light is determined 111, needed for a best possible growth of the plant 70. In the following the actual amount of light emitted by the lighting element 30 is adjusted to the calculated optimal amount 121.

A timer 130 is started, waiting for a defined period of time to trigger 100 the computerized control element 20 and the detector element 40 respectively. During the whole process a user 131 may interact with the computerized control element 20. By entering the sort of the plant 70 the controlling device 10 can assure that the optimal amount of light, being influenced by the chlorophyll absorption curves and depending on a plurality of measurements, is calculated. Furthermore, the method for controlling the growth of the plant 70 may comprise a feedback loop 140 which influences the comparison between the measured values and the optimal values. So an internal knowledge based on the long-term behavior of the plant 70 is generated, enabling a user of the controlling device 10 to optimize his horticulture plant production output.

LIST OF NUMERALS 10 controlling device
15 greenhouse
20 computerized control element
25 user interface
30 lighting element
31 light emitting mean
32 light
33 air
40 detector element
45 second detector element
46,46' third detector element
50 shading mean
55 water supply mean
60 wireless network
61 communication mean
62 wired network
70 plant
71 bed
100 triggering the controlling element
101 measuring the oxygen partial pressure
102 averaging
110 comparing the measured the oxygen partial pressure
111 determining the optimal amount of light
121 emitted the optimal amount
130 timer for repeating
131 input by user
140 feedback loop

The invention claimed is:

1. A controlling device for a greenhouse, the controlling device comprising:
a computerized control element,
a lighting element comprising at least one light-emitting element for illuminating a plant growing in the greenhouse,
at least one first detector element for measuring an oxygen partial pressure in the greenhouse, and
at least one second detector element for measuring a photosynthesis activity of the plant,
wherein an amount of light emitted by the light emitting element is controllable by the computerized control element, based, at least in part, on the measured oxygen partial pressure.

2. A controlling device according to claim 1 wherein the controlling device comprises at least one third detector element for measuring at least one of: a temperature of a substrate or a soil, an ambient temperature within the greenhouse, a humidity of the substrate or soil, a concentration of fertilizer in the substrate or soil, a humidity of the air, a carbon dioxide partial pressure, an amount of air, coming in or out of the greenhouse, a flux of external sunlight, a spectrum of external sunlight and/or a spectrum of the light.

3. A controlling device according to claim 1, further comprising at least one supply element for supplying a resource to the plant, wherein an amount of the resource is controllable by the computerized control element.

4. A controlling device according to claim 1, wherein the light-emitting element is a LED, an OLED, a gas discharge lamp, a high intensity discharge lamp, an incandescent lamp, a fluorescent lamp or a high pressure sodium lamp.

5. A controlling device according to claim 1, further comprising at least one moveable shading element for controlling a level of sunlight shining into the greenhouse.

6. The controlling device of claim 1, wherein the at least one second detector element comprises at least one of: (1) a detector for measuring a starch level of the plant; and (2) a detector for measuring a glucose level of the plant.

7. The controlling device of claim 6, wherein the amount of light emitted by the light emitting element is controllable by the computerized control element, based, at least in part, on the at least one the measured starch level of the plant and the at least one measured glucose level of the plant.

8. The controlling device of claim 1, wherein the at least one second detector element comprises at least one of: (1) a detector for measuring a starch level of the plant; (2) a detector for measuring a glucose level of the plant, and (3) a detector for measuring an amount of light absorbed by a leaf of the plant.

9. The controlling device of claim 1, further comprising a spectrometer for measuring a wavelength distribution of the light emitted by the lighting element.

10. The controlling device of claim 1, wherein the at least one first detector element for measuring an oxygen partial pressure in the greenhouse includes a plurality of detector elements spaced apart and disposed within the greenhouse for measuring the oxygen partial pressure at a plurality of different spatial positions within the greenhouse.

11. The controlling device of claim 1, wherein the lighting element includes at least one blue light-emitting element emitting blue light and at least one red light-emitting element emitting red light, and wherein the computerized control element controls a relative amount of light emitted by the at least one blue light-emitting element and a relative amount of light emitted by the at least one red light-emitting element to achieve a ratio in a desired range for controlling the growth of the plant.

12. A method for controlling a growth of a plant in a greenhouse, the method comprising:
    measuring an oxygen partial pressure within the greenhouse, said oxygen partial pressure related to a photosynthetic activity of a plant in the greenhouse,
    measuring at least one level including at least one of a glucose level and a starch level of the plant;
    transmitting the value of the oxygen partial pressure to a computerized control element,
    determining an optimal amount of light for a desired growth of the plant depending at least in part on the measured oxygen partial pressure and the measured level, and
    adjusting an actual amount of light emitted by a lighting element to the optimal amount.

13. The method according to claim 12, further comprising measuring the oxygen partial pressure at a plurality of different spatial positions within the greenhouse and calculating a spatial averaged value of the oxygen partial pressure within the greenhouse.

14. The method according to claim 13, further comprising comparing the calculated spatial averaged value with values measured in the past.

15. The method according to claim 12, further comprising repeating the method for controlling the growth of the plant in a feedback loop and influencing the adjustment of the optimal amount of light by an input through a user interface.

16. The method of claim 12, further comprising measuring a wavelength distribution of the light emitted by the lighting element.

17. The method of claim 12, wherein the lighting element includes at least one blue light-emitting element emitting blue light and at least one red light-emitting element emitting red light, and wherein the method further includes controlling a relative amount of light emitted by the at least one blue light-emitting element and a relative amount of light emitted by the at least one red light-emitting element to achieve a ratio in a desired range for controlling the growth of the plant.

18. A controlling device for a greenhouse, the controlling device comprising:
    a computerized control element,
    a lighting element comprising a plurality of light-emitting elements for illuminating a plant growing in the greenhouse with light including a grow light component and a control light component, the plurality of light-emitting elements including:
        a first group of light-emitting elements comprising a grow light unit providing the grow light component to the plant, wherein the first group of light-emitting elements includes at least blue light-emitting elements emitting blue light and red light-emitting elements emitting red light, and
        a second group of light-emitting elements comprising a control light unit providing the control light component to the plant, wherein the second group of light-emitting elements includes at least blue light-emitting elements emitting blue light and green light-emitting elements emitting green light, and
    at least one first detector element for measuring an oxygen partial pressure in the greenhouse, and
    wherein computerized control element is configured to control an amount of the light emitted by the light emitting element, based, at least in part, on the measured oxygen partial pressure,
    wherein the computerized control element is configured to control a percentage of blue light within the grow light component to be from 80% to 90% of the grow light component and to control a percentage of red light within the grow light component to be from 10% to 20% of the grow light component, and
    wherein the computerized control element is configured to adjust the control light component to influence at least one of a blooming of the plant, a propagation of the plant, and a size of the plant.

19. The controlling device of claim 18, further comprising at least one moveable shading element for controlling a level of sunlight shining into the greenhouse.

20. The controlling device of claim 18, further comprising a spectrometer for measuring a wavelength distribution of the light emitted by the lighting element.

* * * * *